United States Patent [19]

Hijii

[11] Patent Number: 5,604,745
[45] Date of Patent: Feb. 18, 1997

[54] TDMA MOBILE TELEPHONE APPARATUS

[75] Inventor: Kazuyoshi Hijii, Tokyo, Japan

[73] Assignee: NEC Corporation, Tokyo, Japan

[21] Appl. No.: 495,020

[22] Filed: Jun. 27, 1995

[30]     Foreign Application Priority Data

Jun. 28, 1994  [JP]  Japan ................................. 6-146460

[51] Int. Cl.⁶ ..................................................... H04B 7/26
[52] U.S. Cl. .......................... 370/347; 370/350; 375/342
[58] Field of Search .................................... 375/229, 354,
375/357, 371, 372, 342, 369; 370/105.4,
100.1, 105.3, 95.3; 379/58, 59

[56]                References Cited

U.S. PATENT DOCUMENTS

| 5,005,190 | 4/1991 | Itoi ........................................... 375/357 |
| 5,177,740 | 1/1993 | Toy et al. ................................. 375/357 |

Primary Examiner—Young T. Tse
Attorney, Agent, or Firm—Sughrue, Mion, Zinn, Macpeak & Seas

[57]                ABSTRACT

A TDMA mobile telephone apparatus which has a delay equalizer for equalizing necessary data and outputting equalized data and captures data in a predetermined slot from a signal including a plurality of slots, including: a storage circuit for storing received data and sending the received data to the delay equalizer; a reception position changing circuit for correcting a capture position of the received data by performing slot synchronization in accordance with position correction data from the delay equalizer when a position of data sent from the delay equalizer is offset; a counter circuit for outputting a count value of a reference clock from a clock pulse generation circuit in determining a width of a reception window; and comparison circuit device for determining the number of data to be stored in the storage circuit and the width of the reception window.

6 Claims, 6 Drawing Sheets

TDMA MOBILE TELEPHONE APPARATUS

BACKGROUND OF THE INVENTION

1. Field of the Invention

The present invention relates to a TDMA (Time Division Multiple Access) mobile telephone apparatus and, more particularly, to a TDMA mobile telephone apparatus designed to shorten the processing time required for a delay equalizer.

2. Description of the Prior Art

Of the conventional TDMA mobile telephone apparatuses, a mobile telephone apparatus using a delay equalizer is designed to receive data including a plurality of slots, which are consecutively transmitted, upon performing slot synchronization with a reception window for capturing only self-slots so as to acquire necessary data. Of the data, only necessary data is equalized by the delay equalizer. The resultant data is then sent as a digital value to a control circuit, a speech conversion circuit, or the like.

Figure 1:
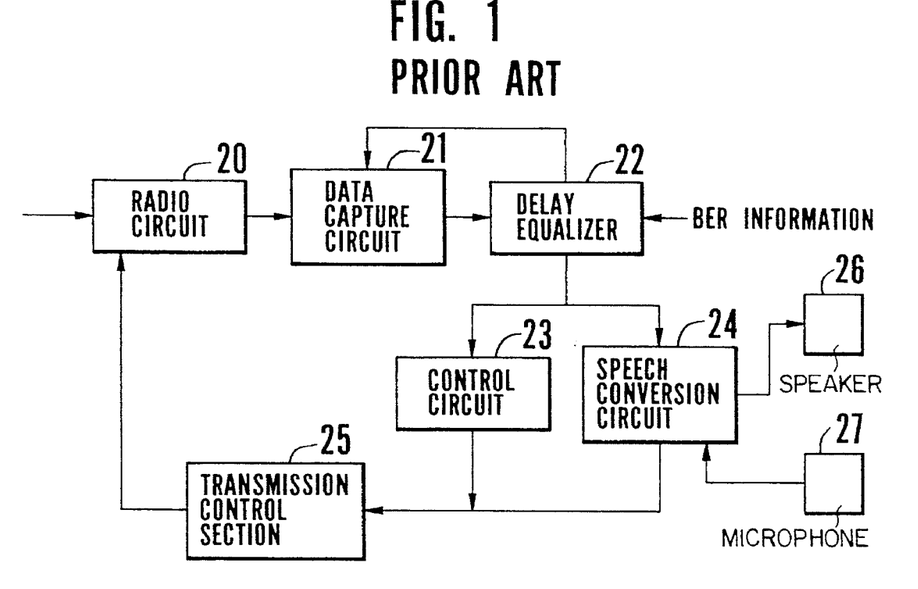
FIG. 1 is a schematic block diagram showing the overall arrangement of a conventional mobile telephone apparatus.

FIG. 1 is a block diagram showing a schematic arrangement of a mobile telephone apparatus using a delay equalizer. A radio circuit 20 receives and transmits electric waves. Received data is stored in a data capture circuit 21. When capture of data is completed by the data capture circuit 21, the captured data is supplied to a delay equalizer 22. In the delay equalizer 22, the data is equalized into digital data to be supplied to a control circuit 23 or a speech conversion circuit 24. The speech conversion circuit 24 converts data into speech and causes a speaker section 26 to output it. Control data or speech data from a microphone section 27 is subjected to data conversion in a transmission control section 25, and the resultant data is transmitted to a base station via the radio circuit 20. BER information is bit error rate information input from a detection circuit (not shown) for detecting a bit error rate to the delay equalizer 22.

Figure 2:
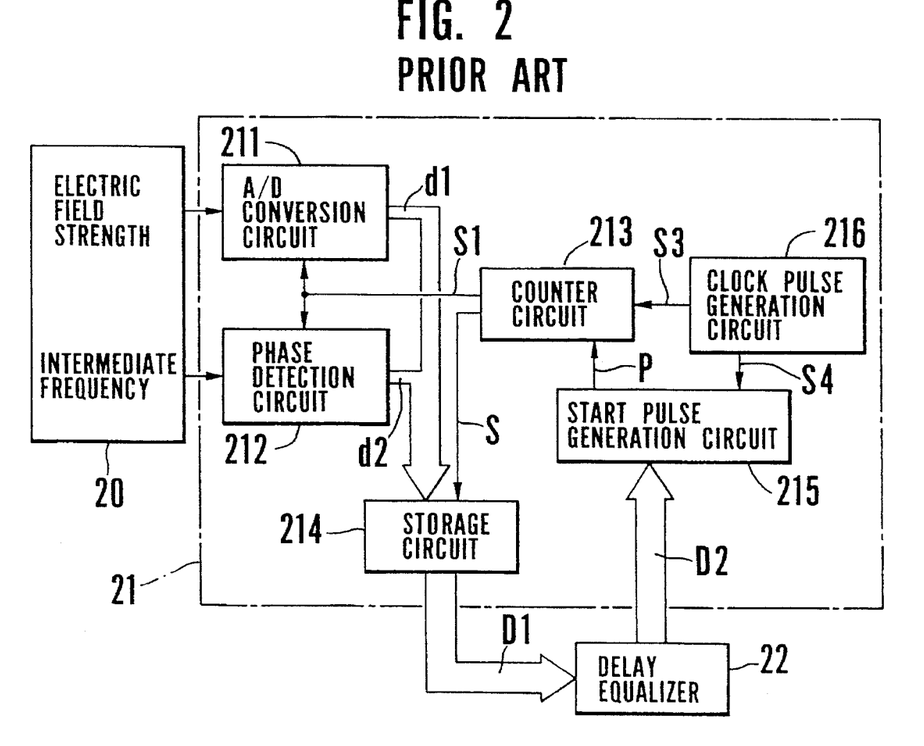
FIG. 2 is a block diagram showing the internal arrangement of a conventional data capture circuit.

FIG. 2 is a block diagram showing the internal circuit arrangement of the data capture circuit 21. The arrangement and operation of the data capture circuit 21 will be described with reference to FIG. 2.

The electric field strength and intermediate frequency of received data input from the radio circuit 20 to an A/D conversion circuit 211 and a phase detection circuit 212 are respectively converted into digital data d1 and d2 in response to a conversion clock signal S1 from a counter circuit 213 (for example, the data d1 and d2 respectively consist of 10 bits and 6 bits, i.e., a total of 16 bits). These digital data d1 and d2 are stored in a storage circuit 214 in accordance with a write signal S from the counter circuit 213. When 380 words (one word consisting of 16 bits) are written, the conversion clock signal S1 and the write signal S are disabled. When a write operation with respect to the storage circuit 214 is completed, the delay equalizer 22 loads received data D1 output from the storage circuit 214, and performs equalization processing. The delay equalizer 22 detects an offset from the position of a SYNC word (to be described letter with reference to FIGS. 3A and 3B), and supplies position information data D2 of the SYNC word to a start pulse generation circuit 215. The start pulse generation circuit 215 adjusts the generation timing of a start pulse P by changing the value of an internal counter in accordance with the position information data D2. When the start pulse P is generated by the start pulse generation circuit 215, the counter circuit 213 generates the conversion clock signal S1 and the write signal S to write the digital data in the storage circuit 214. When 380 words are written, these signals are disabled again. Reference numeral 216 denotes a clock pulse generation circuit 216 for outputting reference clock pulse signals S3 and S4 to the counter circuit 213 and the start pulse generation circuit 215, respectively.

Figure 3A:
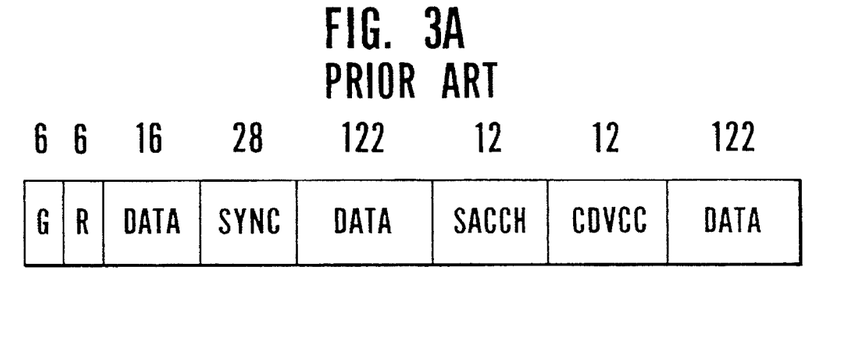
FIGS. 3A and 3B are views respectively showing transmission and reception data formats for the conventional mobile telephone apparatus.
Figure 3B:
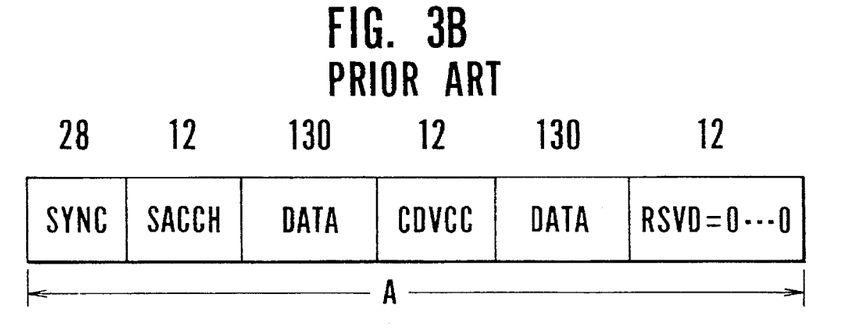

FIGS. 3A and 3B show transmission data formats standardized by the Electrical Industries Association (EIA) in the U.S.A to be used between a mobile telephone apparatus and a base station. The transmission data format shown in FIG. 3A is used for transmission from the mobile telephone apparatus to the base station. The transmission data format shown in FIG. 3B is used transmission in the reverse direction, i.e., from the base station to the mobile telephone apparatus. A width "A" of this data format corresponds to the width of one slot to be captured by the mobile telephone apparatus. Note that the numbers respectively represent the numbers of bits of the respective signals.

Figure 4:
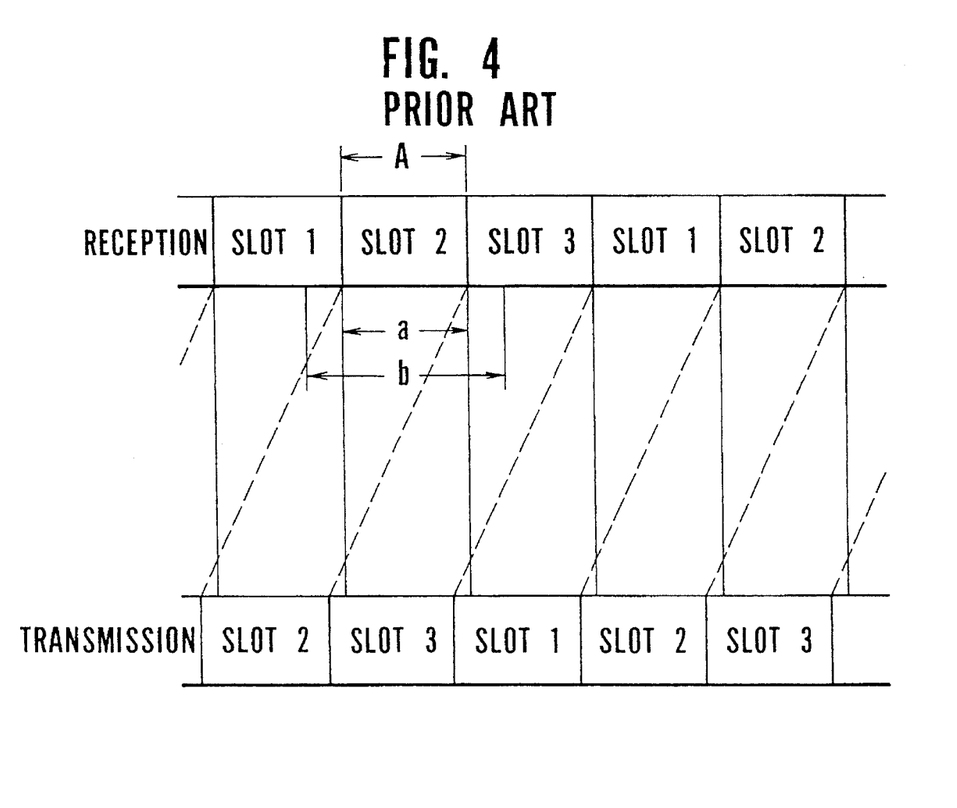
FIG. 4 is a timing chart showing the data transmission/reception timings in the conventional mobile telephone apparatus.

FIG. 4 shows the data transmission/reception timings in the mobile telephone apparatus. Data (see the data format shown in FIG. 3B) transmitted from the base station is received as slot 1, 2, or 3 by the motile telephone apparatus at the reception timing shown at an upper portion of FIG. 4. Data is transmitted from the mobile telephone apparatus to the base station at the transmission timing shown at a lower portion of FIG. 4. As is apparent from FIG. 4, transmission data (see the data format shown in FIG. 3A) is transmitted before the reception timing at which the mobile telephone apparatus receives a slot.

As described above, in the conventional data capture method using the delay equalizer, even when slot synchronization is to be established at the beginning of reception, data is captured within a frame of a predetermined capture width determined for each data capturing operation. For this reason, if the capture width is small, no sync signal may be captured, resulting in failure in slot synchronization. In order to prevent this, in the conventional method, as indicated by "b" in FIG. 4, the actual capture width is set to be large in advance so as to capture data in a range wider than a range "a", in which data should be captured, by several bits to several tens of bits. With this setting, a sync signal can be reliably captured. That is, the actual capture range includes a data portion (e.g., "RSVD") one data portion before the slot to be received, the slot to be received, and a data portion (e.g., "SYNC") of the next slot. Note that a slot is discriminated by using the SYNC signal.

Once slot synchronization is established, however, unnecessary data is also captured because a reception window is set to be larger than the width of a slot to be received. For this reason, the amount of data processed by the delay equalizer increases. The delay equalizer performs frequency matching, correction of a reception position, and the like in addition to equalization of predetermined data of radio data. Therefore, with an increase in data amount, the processing time required for the delay equalizer prolongs. As a result, the processing may not be performed in time, and transmission/reception may not be smoothly performed.

Furthermore, as the operating time of the delay equalizer prolongs, the power consumption increases.

SUMMARY OF THE INVENTION

The present invention has been made in consideration of the above situation, and has as its object to provide a TDMA mobile telephone apparatus which can shorten the processing time required for a delay equalizer and reduce the power consumption by reducing the amount of data processed by the delay equalizer.

In order to achieve the above object, according to the basic aspect of the present invention, a TDMA mobile telephone apparatus which has a delay equalizer for equalizing necessary data and outputting equalized data and captures data in a predetermined slot from a signal including a plurality of slots, comprising a storage circuit for storing received data and sending the received data to the delay equalizer, a reception position changing circuit for correcting a capture position of the received data by performing slot synchronization in accordance with position correction data from the delay equalizer when a position of data sent from the delay equalizer is offset, a counter circuit for outputting a count value of a reference clock from a clock pulse generation circuit in determining a width of a reception window, and comparison circuit means for determining the number of data to be stored in the storage circuit and the width of the reception window.

In association with the above basic aspect, according to the present invention, the following aspects are provided.

According to the first aspect, the comparison circuit means of the basic aspect comprises a plurality of comparison circuits each for receiving a count value from the counter circuit, and a selection circuit for selecting one comparison circuit to be used in accordance with a selection signal from the delay equalizer.

According to the second aspect, the comparison circuit means of the basic aspect comprises a plurality of comparison circuits each for receiving a count value from the counter circuit, a latch circuit for setting one of a plurality of signals from a data bus line of the delay equalizer at level "H", and a combination of AND and OR circuits arranged to extract one of outputs from the plurality of comparison circuits as an "H"-level signal.

According to the third aspect, the comparison circuit means of the basic aspect comprises one comparison circuit for receiving a count value from the counter circuit, and a latch circuit for inputting a set value associated with the width of the reception window, which is arbitrarily rewritten through a data bus of the delay equalizer, to the comparison circuit.

According to the fourth aspect, the apparatus further comprises an error rate detection circuit for detecting a signal error rate, so that when a value of an error rate output from the error rate detection circuit is not more than a predetermined value, the selection circuit is operated to select/change the comparison circuits.

According to the fifth aspect, the apparatus further comprises an error rate detection circuit for detecting a signal error rate, so that when a value of an error rate output from the error rate detection circuit is not more than a predetermined value, a set value of the width of the reception window, which is input from the latch circuit to the comparison circuit, is changed by operating the delay equalizer.

According to the present invention, in the TDMA mobile telephone apparatus, since the width of the reception window can be changed, the width of received data required by the delay equalizer can be changed depending on whether slot synchronization is performed or equalization is performed upon completion of slot synchronization. In changing the position of the reception window at the beginning of reception or the like, the reception window is broadened to ensure reception of a sync signal. After the position of the reception window is set, and reception is started, the width of the reception window is reduced to shorten the operating time of the delay equalizer and the data capture time. Therefore, the processing time can be shortened, and the power consumption can be reduced.

DETAILED DESCRIPTION OF THE PREFERRED EMBODIMENTS

The present invention will be described in detail below with reference to the preferred embodiments shown in the accompanying drawings.

Figure 5:
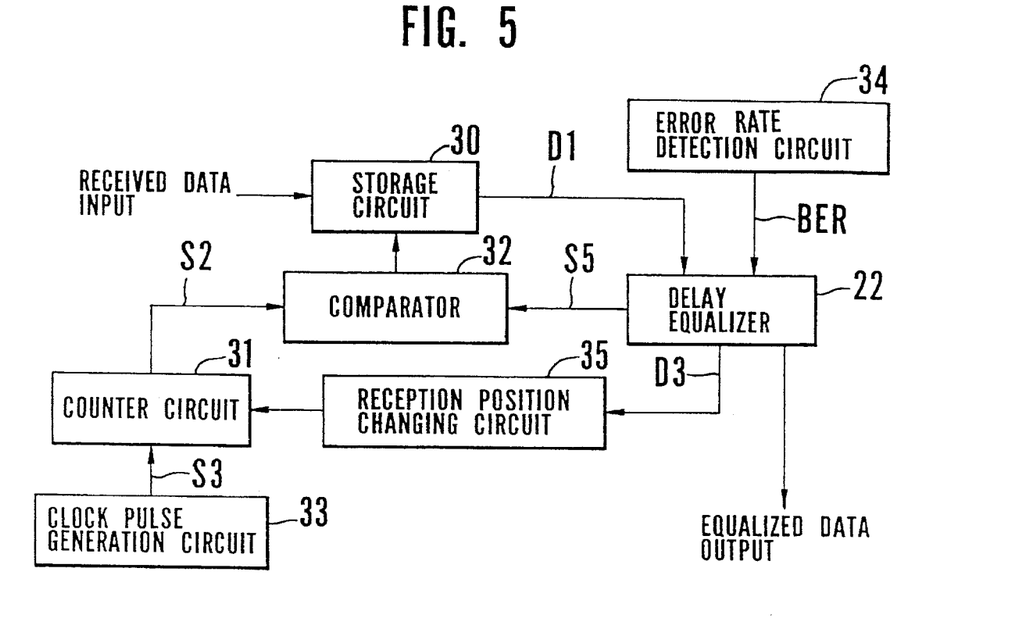
FIG. 5 is a block diagram the basic arrangement of the main part of a mobile telephone apparatus according to the present invention.

FIG. 5 is a block diagram showing the internal circuit arrangement of a data capture circuit 21 of the present invention. The data capture circuit 21 comprises a storage circuit 30 for receiving and storing received data from a radio circuit and outputting received data D1 to a delay equalizer 22, a comparator 32 for determining the number of data to be stored in the storage circuit 30 and the width of a reception window in accordance with signals from the delay equalizer 22, a counter circuit 31 for inputting a count value S2 to the comparator 32, a clock pulse generation circuit 33 for outputting a reference clock pulse signal to the counter circuit 31, a reception position changing circuit 35 for performing slot synchronization upon receiving position correction data D3 from the delay equalizer 22, when the position of "SYNC WORD" is offset, so as to correct the capture position of received data, an error rate detection circuit 34 for outputting BER information to the delay equalizer 22, and the like.

The comparator 32 is a unit for outputting a stop pulse to the storage circuit 30 when a set value (the width of the reception window in this case) coincides with a count value from the counter circuit 31. Several embodiments of the comparator 32 are conceivable. In this case, three embodiments of the comparator will be described with reference to FIGS. 6, 8A, and 9.

Figure 6:
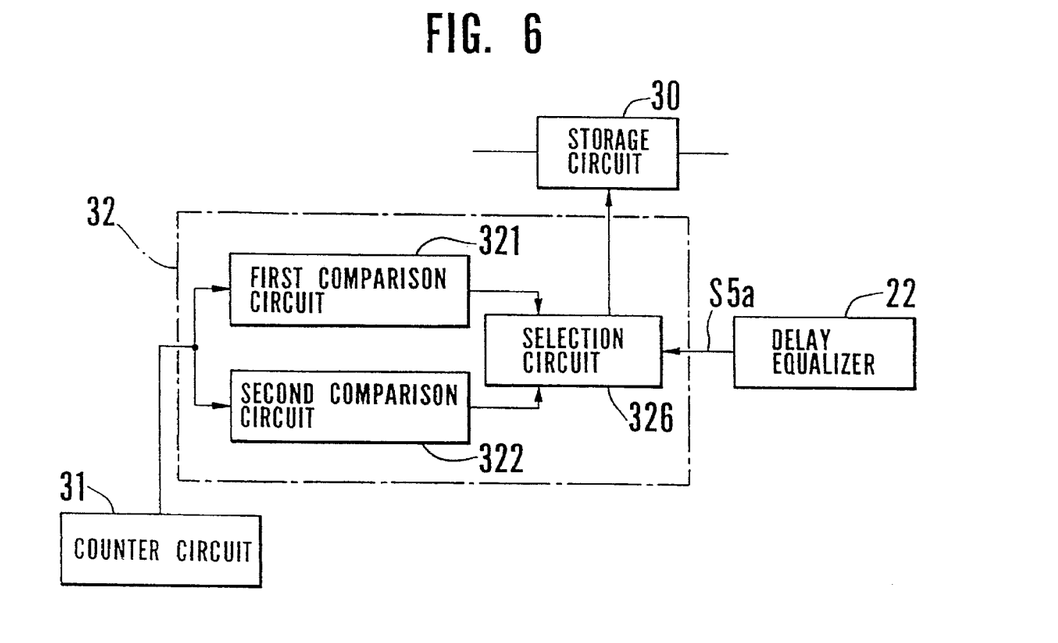
FIG. 6 is a block diagram showing a comparator according to an embodiment of the present invention.

FIG. 6 is a block diagram showing the circuit arrangement of the first embodiment. According to the first embodiment, the comparator 32 is constituted by first and second comparison circuits 321 and 322 respectively having different set values, and a selection circuit 326 for selecting one of these comparison circuits in accordance with a selection signal from the delay equalizer 22. The delay equalizer 22 receives data having the reception data format, e.g., 380 words, from the storage circuit 30. The delay equalizer 22 then checks the position of "SYNC WORD" and performs equalization. If the position of "SYNC WORD" is offset, the delay equalizer 22 outputs the position correction data D3 to correct the capture position of the received data. When the data capture position is determined and reception is stabilized, the delay equalizer 22 outputs a selection signal to decrease the number of data to be captured. For example, the number of data to be captured can be decreased from 380 words to 324 words (minimum value).

Figure 8A:
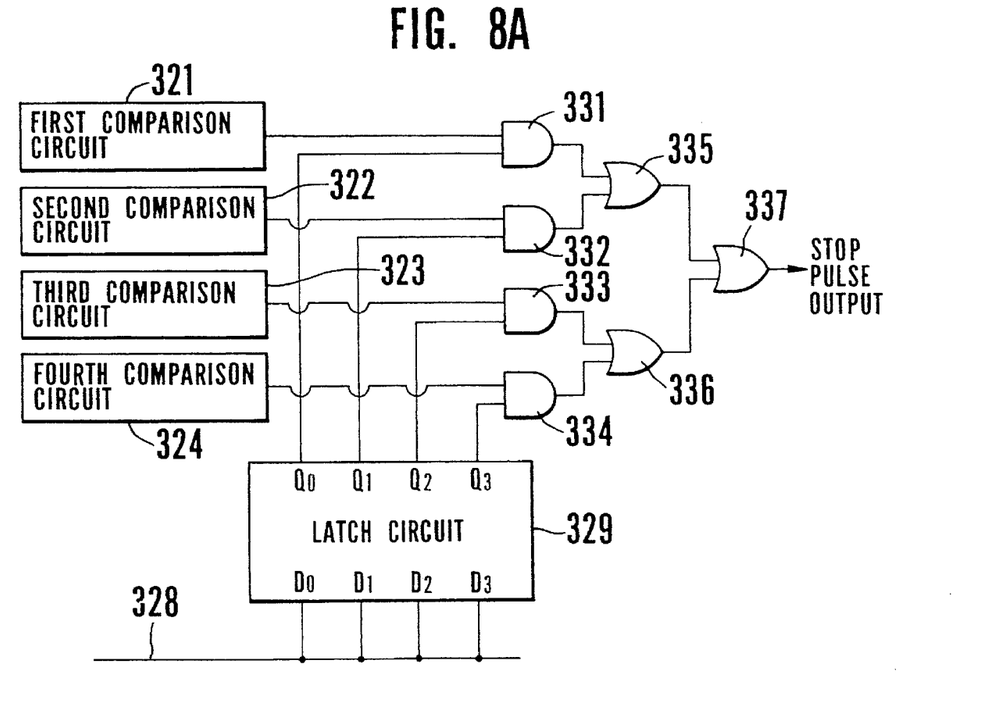
FIG. 8A is a block diagram showing a comparator according to the second embodiment of the present invention.
Figure 8B:
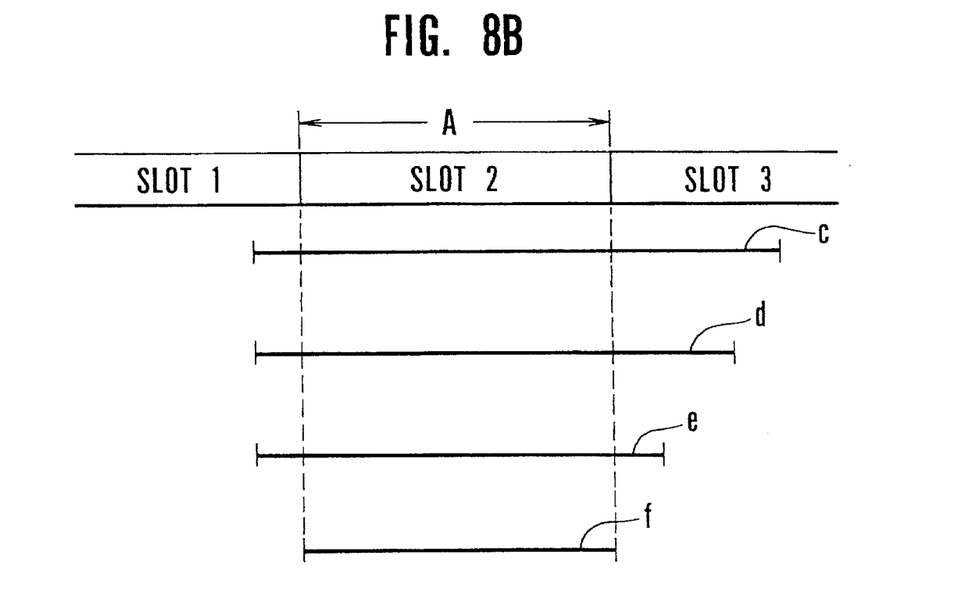
FIG. 8B is a view for explaining an example of data capture performed by the comparator shown in FIG. 8A.

FIG. 8A is a block diagram showing the circuit arrangement of the comparator according to the second embodiment of the present invention. The comparator of the second embodiment includes, for example, first to fourth comparison circuits 321, 322, 323, and 324 respectively having different set values, and uses, as a selection circuit, a circuit obtained by combining a latch circuit 329 with a data bus line 328 of the delay equalizer 22. With this circuit arrangement, a signal output from the delay equalizer 22 via the data bus line 328 is set at level "H" by the latch circuit 329. As a result, one of four gates (AND circuits) 331 to 334 is set in an ON state, and a stop pulse is output from one of the first to fourth comparison circuits 321 to 324 via three gates (OR circuits) 335 to 337. With this circuit arrangement of the comparator, one of a plurality of comparison circuits can be selected, and hence the width of the reception window can be controlled in multiple steps like ranges c to f in FIG. 8B.

Figure 9:
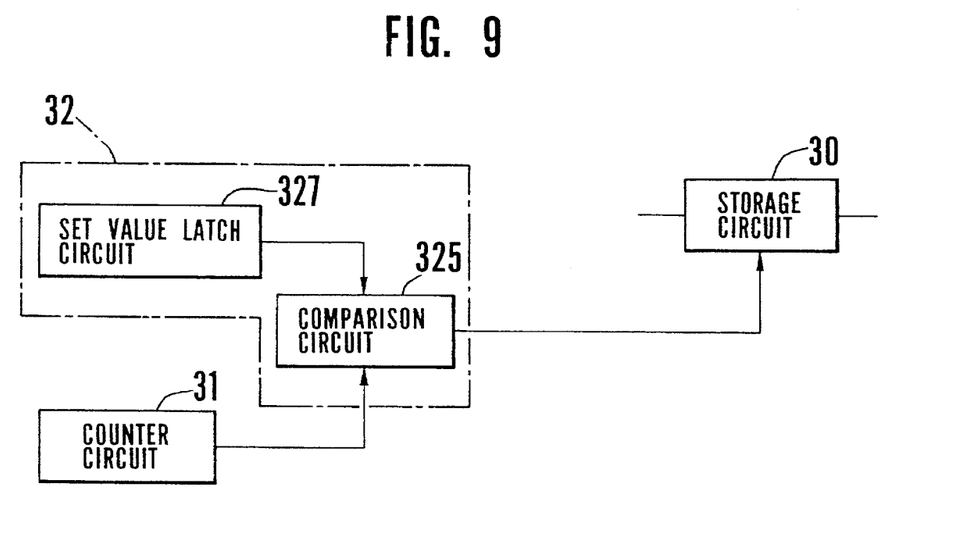
FIG. 9 is a block diagram showing a comparator according to the third embodiment of the present invention.

FIG. 9 is a block diagram showing the circuit arrangement of the comparator according to the third embodiment of the present invention. According to this embodiment, a set value output from a set value latch circuit 327 is used as a set value in a comparison circuit 325, and a set value output from the set value latch circuit 327 is arbitrarily rewritten through a data bus of the delay equalizer 22. According to this arrangement, the width of a reception window can be changed. Therefore, the width of the reception window can be sequentially changed while a decrease in error rate is detected.

Although not shown in the accompanying drawings, the width of the reception window may be increased/decreased by changing the timings of the beginning and end of reception instead of directly changing the width of the reception window.

Figure 7:
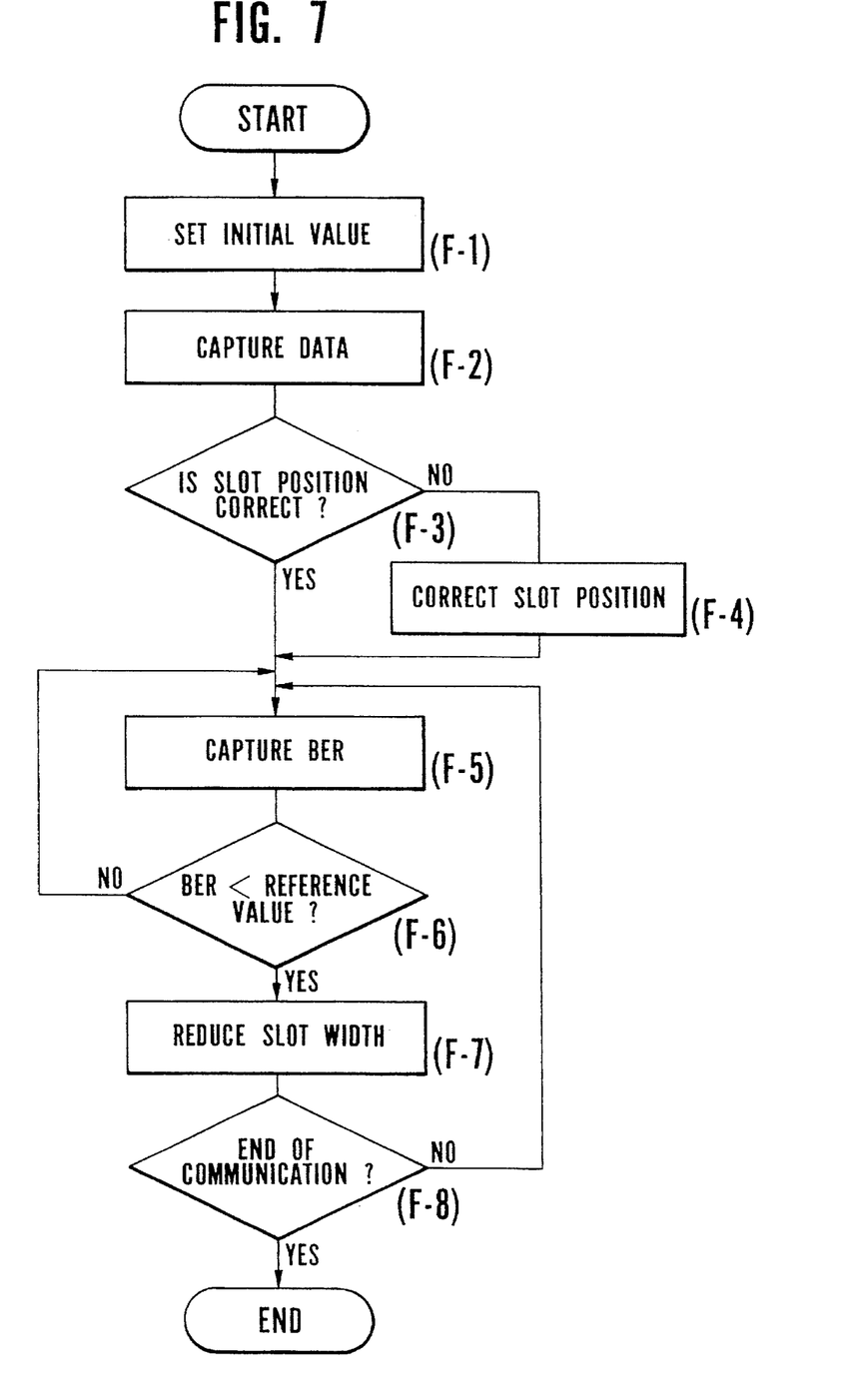
FIG. 7 is a flow chart showing the operation of a mobile telephone apparatus having the comparator shown in FIG. 6.

The operation of the mobile telephone apparatus of the present invention, which has the comparator shown in FIG. 6, will be described with reference to the flow chart of FIG. 7. When reception is to be newly performed, different widths of the reception window are set as initial values in the first and second comparison circuits 321 and 322, and the selection circuit 326 selects the first comparison circuit 321 in which a wider width is set (step F-1). In the reception mode, first of all, the reception window opens regardless of the position of data to capture data (step F-2). In this case, the selection circuit 326 selects the first comparison circuit 321, and hence the wider value set in the first comparison circuit 321 is output. Therefore, the width of the reception window is larger than the slot width A, as indicated by "b" in FIG. 4. That is, first captured data always contains any of the synch signals.

When the delay equalizer 22 detects a sync signal in the captured data, the position of the open reception window is checked (step F-3). If the received slot is different from a self-slot, the position correction data D3 is output to the reception position changing circuit 35 to correct the position of the reception window in accordance with the position of the self-slot, thereby performing slot synchronization.

When the position of the reception window is determined by the reception position changing circuit 35, the delay equalizer 22 checks a sync signal and equalizes control (or speech) data. When slot synchronization is performed, the delay equalizer 22 captures a bit error rate (BER information) from the error rate detection circuit 34, and discriminates whether the bit error rate is below a reference value (step F-6). If the bit error rate is below the reference value, a selection signal S5a for a comparison circuit is output to the selection circuit 326. Upon reception of the selection signal S5a, the selection circuit 326 switches from the first comparison circuit 321 to the second comparison circuit 322 to switch the number of data to be captured into the storage circuit 30 and the width of the reception window, thereby reducing the width of the reception window, as indicated by "a" in FIG. 4 (step F-7).

As described above, after the position of the reception window is determined, and reception is continued, reception is only required by only the width of a slot. Therefore, the width of the reception window need not be large. By reducing the width of the reception window, the amount of data equalized by the delay equalizer 22 decreases, and the processing time can be shortened. In addition, the power consumption can be reduced. Subsequently, communication is continued until a signal for stopping communication is input. When the end signal is received, the communication is stopped (step F-8).

What is claimed is:

1. A TDMA mobile telephone apparatus which has a delay equalizer for equalizing necessary data and outputting equalized data, and which captures data in a predetermined slot from a signal including a plurality of slots, said apparatus comprising:

(a) a storage circuit for storing received data and sending the received data to said delay equalizer;

(b) a reception position changing circuit for correcting a capture position of the received data by generating a start pulse signal for performing slot synchronization in accordance with position correction data from said delay equalizer when a position of data sent from said delay equalizer is offset;

(c) a counter circuit for outputting a count value of a reference clock from a clock pulse generation circuit in determining a width of a reception window, said counter circuit being responsive to said start pulse signal; and (d) comparison circuit means for determining the number of data to be stored in said storage circuit and the width of the reception window, said comparison circuit means receiving said count value, and outputting a stop pulse to said storage circuit when said count value coincides with a set value;

wherein said comparison circuit means determines said reception window width in response to a selection signal from said delay equalizer.

2. An apparatus according to claim 1, wherein said comparison circuit means comprises a plurality of comparison circuits each for receiving said count value from said counter circuit, and a selection circuit for selecting one comparison circuit to be used in accordance with said selection signal from said delay equalizer.

3. An apparatus according to claim 1, wherein said comparison circuit means comprises a plurality of comparison circuits each for receiving said count value from said counter circuit, a latch circuit for setting one of a plurality of signals from a data bus line of said delay equalizer at level "H", and a combination of AND and OR circuits arranged to extract one of outputs from said plurality of comparison circuits as an "H"-level signal.

4. An apparatus according to claim 1, wherein said comparison circuit means comprises one comparison circuit for receiving said count value from said counter circuit, and a latch circuit for inputting a set value associated with the width of the reception window, which is arbitrarily rewritten through a data bus of said delay equalizer, to said comparison circuit.

5. An apparatus according to claim 2, further comprising an error rate detection circuit for detecting a signal error rate, so that when a value of an error rate output from said error rate detection circuit is not more than a predetermined value, said selection circuit is operated to select/change said comparison circuits.

6. An apparatus according to claim 4, further comprising an error rate detection circuit for detecting a signal error rate, so that when a value of an error rate output from said error rate detection circuit is not more than a predetermined value, a set value of the width of the reception window, which is input from said latch circuit to said comparison circuit, is changed by operating said delay equalizer.

* * * * *